Patented Mar. 28, 1944

2,344,992

UNITED STATES PATENT OFFICE 2,344,992

17-ALDEHYDO-ANDROSTANES AND A PROCESS OF PRODUCING THE SAME

Willy Logemann, Berlin-Charlottenburg, and Hans Dannenbaum, Falkenhain-Finkenkrug, near Berlin, Germany, assignors to Schering Corporation, Bloomfield, N. J., a corporation of New Jersey No Drawing. Application June 17, 1938, Serial No. 214,313. In Germany June 21, 1937

17 Claims. (Cl. 260—397.4)

This invention relates to 17-aldehydo-androstanes and a method of producing the same.

In U. S. specification Serial No. 180,138 filed December 16, 1937, there is described a process for the manufacture of oxo compounds of the cyclopentano-poly-hydrophenanthrene series and in particular ketones of this series, in which the oxo group is present in the side chain attached to the ring system and in particular in the side chain attached to the five membered ring. For this purpose there are employed as starting materials compounds of the general formula:

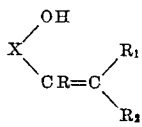

in which X is a cyclopentano-polyhydrophenanthrene residue, R is hydrogen or a hydrocarbon residue, and $R_1$ and $R_2$ are hydrogen and/or a hydrocarbon residue.

In accordance with the present invention compounds of the cyclopentano-polyhydrophenanthrene series which contain on the carbon atom 17 an aldehyde group, that is to say compounds of the general formula:

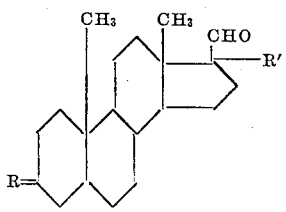

wherein R represents a member taken from the group consisting of =O and

X being hydroxyl or a radical capable of being converted into hydroxyl, for example, with the aid of hydrolysis, and R' indicates hydrogen or a hydroxyl group, are obtained when compounds of the cyclopentano-polyhydrophenanthrene series which contain on the carbon atom 17 an unsaturated side chain

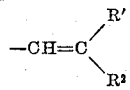

are subjected to degradation by oxidation. In the above formula R' and $R^2$ indicate hydrogen and/or any substituted or unsubstituted hydrocarbon residue, as for example an alkyl, aryl, aralkyl or a cycloalkyl group. The double bond is situated between the carbon atoms 20 and 21.

For the present process there come into consideration in particular the 17-vinyl-androstane compounds saturated or unsaturated in the ring system, which are obtained for example by partial hydrogenation of the corresponding alkinyl-like compounds as are obtained when acetylene is allowed to react in the presence of alkali metals on 17-keto-aetiocholanes. Such unsaturated compounds can, however, be obtained also directly from the corresponding aetiocholane compounds, when for example according to the process of U. S. specification Serial No. 109,674 filed November 7, 1936, 17-keto-aetiocholanes are caused to react with alkenyl metal organic compounds.

The ring system can be saturated or unsaturated and can contain substituents of various kinds, in particular further hydroxy or oxo groups. The compounds of the specified type are subjected to a degradation by oxidation in which case suitably ozone is employed. Hydroxyl groups present in the ring system can be protected for example by acylation or alkylation. If double bonds are present in the ring system these must be protected before the oxidation for example by adding on halogen or halogen hydride, in which case it is suitable to employ bromine for this purpose. As is known in the case of the same treatment of stigmasterol, such saturation of the ring system has no effect on the unsaturated condition of the side chain.

The reformation of the double bond in the nucleus when oxidation has taken place proceeds in known manner for example by treatment of the dihalogenides with zinc dust in glacial acetic acid solution, or in the case of adding on of halogen hydride, with pyridine and other known agents, as are described for example in Houben-Weyl "Die Methoden der organischen Chemie" vol. 3, 2nd edition (1923), page 909 et seq., and vol. 2, 2nd edition, (1922), page 744 et seq.

The process may be illustrated by the following formulas:

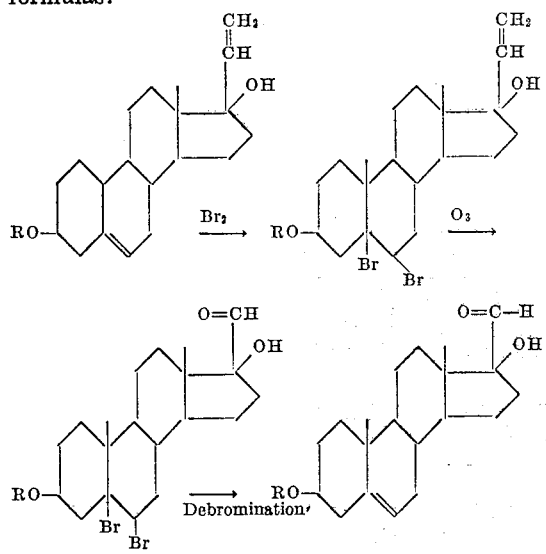

The following examples illustrate the invention:

EXAMPLE 1

2 grams of 3.17-diacetoxy-17-ethenyl-androstene are dissolved in 200 ccs. of carbon tetrachloride and treated with 0.5 cc. of pyridine. Thereto are added with a stirring 0.799 gram of bromine (1 mol) in 50 ccs. of carbon tetrachloride. After addition of the bromine the whole is stirred for 1 hour further and then for 1 hour ozone passed through the reaction solution (rate of flow 4 litres per hour). Finally the whole is treated with 200 ccs. of glacial acetic acid and the ozone driven out by nitrogen. After 24 hours the carbon tetrachloride is evaporated in vacuum at 30° C. and to the glacial acetic acid solution at a temperature of about 10–20° C. 5 grams of zinc dust added. The whole is stirred for half an hour in the cold and for the same time at 95–100° C. It is then filtered from zinc dust and poured into water. The separated precipitate is taken up in benzene and the benzene washed with water in order to remove the glacial acetic acid.

The acids produced in the ozonisation can be extracted with alkali from the benzene solution. The alkaline solution which contains the alkali salts of the acids is acidified with dilute sulphuric acid and extracted with ether. The ether residue is crystallised from acetone. There is obtained the 3.17-diacetoxy-etiocholenic acid of melting point 216° C.

The benzene solution freed from the acids is washed neutral with water and evaporated. The residue is gently heated with a solution of semicarbazide acetate in methanol in which case no precipitate separates. The whole is taken up in a large volume of ether and the ether washed with alkali and water. The residue obtained after evaporation of the ether is ground with a little ether and the semicarbazone of the 3.17-diacetoxy-etiocholenic acid aldehyde purified in this manner filtered with suction and from it after splitting with benzaldehyde the free aldehyde obtained.

EXAMPLE 2

3.43 grams of 3-acetoxy-17-ethenyl-androstene are dissolved in 200 ccs. of chloroform. Thereto is added one drop of pyridine and afterwards a solution of 1.6 grams of bromine (1 mol) in 50 ccs. of chloroform. The temperature should be about 0–5° C.

Into this solution ozone is passed during 4 hours (rate of passage 10 litres per hour).

Subsequently the whole is treated with 200 ccs. of glacial acetic acid and the chloroform evaporated in vacuum at a temperature of about 30° C. To the glacial acetic acid solution 5 grams of zinc dust are then added. The whole is then stirred for half an hour at room temperature and then for half an hour at 100° C. Then the zinc dust is filtered off and the product poured into water. The precipitate is taken up in benzene and the benzene solution washed with water. The acid constituents are then extracted with dilute sodium carbonate solution. Then the benzene solution is washed neutral with water and evaporated.

The crude aldehyde is purified by recrystallisation several times from dilute acetone. The yield amounts to 20%.

EXAMPLE 3

3.17-dihydroxy-17-aldehydo-androstene 1 gram of dehydroandrosterone is treated in 100 ccs. of absolute ether with 8 grams of bromostyrene and then with a few pieces of activated lithium metal. The brisk reaction is interrupted as soon as a stable brown-red colour has been produced, the product decomposed with alcohol and water, extracted with ether and the evaporated extract treated in vacuum with steam until the last residues of bromostyrene have disappeared. The product is taken up in benzene, dried, treated with half the volume of hexane and chromatographed over 25 grams of aluminium oxide. The benzene-hexane fraction is thrown away and the aluminium oxide is subjected to elution with benzene-alcohol (50:1); the elute leaves on evaporation the 3.17-dihydroxy-17-styryl-androstene as a clear hard glass (mixture of isomers).

For the preparation of the 17-aldehydo-3.17-dihydroxyandrostene the product is dissolved in purest ethyl acetate (20 ccs.), treated with 1 mol of bromine (=484 mg., dissolved in about 5 ccs. of ethyl acetate) and when decolorisation has taken place treated for 4 hours with ozone at 0° C. Then the excess of ozone is displaced with carbon dioxide, the ozonide destroyed with zinc dust and subsequently debrominated by addition of further zinc dust and some alcohol with heating. The whole is filtered, evaporated, taken up in ether, acids separated with sodium carbonate solution and the washed, dried and evaporated ether extract crystallised from acetone. Yield 300 mg. of yellowish small lumps; the preparation gives a distinct aldehyde reaction wtih Schiff's reagent.

The product thus obtained is for uniformity oxidised on the carbon atom 3 completely to the keto group with aluminium isopropylate, since this reaction has already been partly effected by the ozonisation. 3-oxo-17-hydroxy-17-aldehydo-androstene is obtained.

Instead of the ozone employed in the examples also other oxidising agents can be employed which are suitable to degrade compounds with double bonds with the attachment of oxygen as for example chromic acid, tetracetates such as lead or manganese tetracetate, permanganates, and the like.

Having now particularly described and ascertained the nature of our said invention and in what manner the same is to be performed, we declare that what we claim is:

1. A process for the manufacture of 17-aldehydo-androstanes comprising oxydatively degrading compounds taken from the group consisting of nuclearly saturated and nuclearly unsaturated cyclopentano-polyhydrophenanthrene compounds containing on the carbon atom 17 an unsaturated side chain having a double bond located between carbon atoms 20 and 21.

2. A process as claimed in claim 1 wherein the cyclopentanopolyhydrophenanthrene compounds contain on the carbon atom 17 the unsaturated side chain

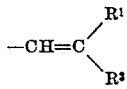

wherein $R^1$ and $R^2$ are each one of the group consisting of hydrogen, a substituted hydrocarbon residue and a hydrocarbon residue.

3. A process as claimed in claim 1 wherein ozone is employed to carry out the oxidating degradation.

4. A process as claimed in claim 1 wherein 17-vinyl-androstane is the cyclopentano-polyhydrophenanthrene compound oxidatively degraded.

5. A process as claimed in claim 1 wherein any hydroxyl groups present in the starting cyclopentano-polyhydrophenanthrene compounds are converted by acylation and alkylation into the corresponding ester and ether groups.

6. A process as claimed in claim 1 wherein before oxidative degradation a nuclearly unsaturated cyclopentano-phenanthrene starting compound is treated with a member of the group consisting of halogen and halogen hydrides.

7. Compounds of the cyclopentano-polyhydrophenanthrene series belonging to the group consisting of saturated and unsaturated 17-aldehydo-androstanes of the general formula

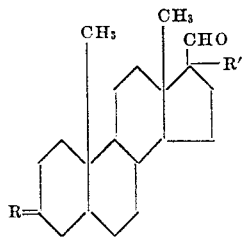

wherein R represents a member taken from the group consisting of =O and

wherein X is one of the group consisting of hydroxyl and radicals capable of being hydrolyzed to form an hydroxyl, and $R^1$ represents a group convertible with the aid of hydrolysis into hydroxyl.

8. 3.17-diacetoxy-etiocholenic acid aldehyde.
9. 3-acetoxy-17-oxy-etiocholenic acid aldehyde.
10. 3.17-dioxy-ethiocholenic acid aldehyde.
11. Compounds of the cyclopentano-polyhydro-phenanthrene series belonging to the group consisting of saturated and unsaturated 17-aldehydo-androstanes of the general formula

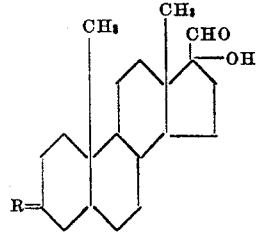

wherein R represents a member taken from the group consisting of =O and

wherein X is one of the group consisting of hydroxyl and radicals capable of being converted into hydroxyl with the aid of hydrolysis, and wherein the carbon-carbon double bond in the case of the unsaturated aldehydo-androstanes is between the carbon atom 5 and an adjacent carbon atom.

12. A process as claimed in claim 1, wherein before oxidative degradation a nuclearly unsaturated cyclopentano-phenanthrene starting compound is treated with a substance capable of being added on to the nuclear double bond and of being split off after the oxidative degradation to regenerate the unsaturated bond.

13. Compounds of the cyclopentano polyhydrophenanthrene series containing at 17-position an aldehyde radical and in 3-position a keto group.

14. Saturated and unsaturated 17-formyl-cyclopentano-10,13-dimethyl - polyhydro - phenanthrenes containing in 3-position a member of the group consisting of hydroxyl and radicals capable of being converted into hydroxyl with the aid of hydrolysis.

15. Saturated and unsaturated 17-formyl-17-OH-cyclopentano - 10:13 - dimethyl-polyhydrophenanthrenes.

16. Saturated and unsaturated 17-formyl-17-X - cyclopentano-10:13-dimethyl-polyhydrophenanthrenes wherein X is a member of the class consisting of free and substituted hydroxyl groups.

17. A compound of the group consisting of the saturated and unsaturated 17-formyl-17-X-cyclopentano - 10,13 - dimethyl-polyhydrophenanthrenes, wherein X represents esterified hydroxyl.

WILLY LOGEMANN.
HANS DANNENBAUM.